(12) United States Patent
Amini et al.

(10) Patent No.: US 10,999,834 B2
(45) Date of Patent: May 4, 2021

(54) METHOD AND APPARATUS FOR GENERATING AND MAINTAINING AN ACCURATE NETWORK MAP IN A COMMUNICATIONS NETWORK

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 15/853,547

(22) Filed: Dec. 22, 2017

(65) Prior Publication Data

US 2018/0310186 A1 Oct. 25, 2018

Related U.S. Application Data

(60) Provisional application No. 62/488,258, filed on Apr. 21, 2017.

(51) Int. Cl.
*H04W 16/18* (2009.01)
*H04W 24/02* (2009.01)
(Continued)

(52) U.S. Cl.
CPC .......... *H04W 72/0426* (2013.01); *G06F 8/65* (2013.01); *H04L 1/0004* (2013.01); *H04L 1/18* (2013.01);
(Continued)

(58) Field of Classification Search
CPC . H04L 29/0621; H04L 1/0003; H04L 1/0004; H04L 1/18; H04L 1/1812; H04L 1/188; H04L 27/34; H04L 61/1511; H04L 61/2015; H04L 63/14; H04L 69/18; H04L 69/22; H04L 69/324; H04L 69/329; H04L 9/0816; H04W 16/18; H04W 24/02; H04W 48/20; H04W 72/0426; H04W 84/12; H04W 84/20; H04W 88/08; H04W 92/20;
(Continued)

(56) References Cited

U.S. PATENT DOCUMENTS 4,200,770 A   4/1980  Diffie et al.
7,606,175 B1 * 10/2009  Maufer ................ H04W 8/005
                                                    370/255
(Continued)

FOREIGN PATENT DOCUMENTS

CN           1416232 A      5/2003
CN           1987798 A      6/2007
(Continued)

*Primary Examiner* — Ahmed Elallam
(74) *Attorney, Agent, or Firm* — Perkins Coie LLP

(57) ABSTRACT

Layer 2 refers to the Data Link layer of the commonly-referenced multilayered communication model, Open Systems Interconnection (OSI). The Data Link layer is concerned with moving data across the physical links in the network. Embodiments of the invention provide a Layer 2 and management modification to provide and maintain an accurate network map. Embodiments of the invention modify Layer 2 functionality to work with a multi-AP system without central management or with central management, and modify management frames to quickly update the network map when the client roams or when topology changes.

17 Claims, 13 Drawing Sheets

(51) Int. Cl.

| | | |
|---|---|---|
| *H04W 40/20* | (2009.01) | |
| *H04W 48/20* | (2009.01) | |
| *H04W 72/04* | (2009.01) | |
| *H04W 72/12* | (2009.01) | |
| *H04L 1/00* | (2006.01) | |
| *H04W 40/24* | (2009.01) | |
| *H04L 1/18* | (2006.01) | |
| *H04L 27/34* | (2006.01) | |
| *H04L 29/06* | (2006.01) | |
| *H04W 40/02* | (2009.01) | |
| *G06F 8/65* | (2018.01) | |
| *H04L 9/08* | (2006.01) | |
| *H04W 92/20* | (2009.01) | |
| *H04W 84/12* | (2009.01) | |
| *H04W 4/06* | (2009.01) | |
| *H04L 29/12* | (2006.01) | |
| *H04L 29/08* | (2006.01) | |
| *H04W 4/80* | (2018.01) | |
| *H04W 84/20* | (2009.01) | |
| *H04W 88/08* | (2009.01) | |

(52) U.S. Cl.
CPC ............ *H04L 9/0816* (2013.01); *H04L 27/34* (2013.01); *H04L 63/14* (2013.01); *H04L 69/18* (2013.01); *H04L 69/22* (2013.01); *H04W 16/18* (2013.01); *H04W 24/02* (2013.01); *H04W 40/02* (2013.01); *H04W 40/244* (2013.01); *H04W 48/20* (2013.01); *H04W 72/1242* (2013.01); *H04L 1/0003* (2013.01); *H04L 1/188* (2013.01); *H04L 1/1812* (2013.01); *H04L 61/1511* (2013.01); *H04L 61/2015* (2013.01); *H04L 69/324* (2013.01); *H04L 69/329* (2013.01); *H04W 4/06* (2013.01); *H04W 4/80* (2018.02); *H04W 84/12* (2013.01); *H04W 84/20* (2013.01); *H04W 88/08* (2013.01); *H04W 92/20* (2013.01)

(58) Field of Classification Search
CPC ..... H04W 40/02; H04W 40/244; H04W 4/06; H04W 4/80; H04W 72/1242; G06F 8/65
See application file for complete search history.

(56) References Cited

U.S. PATENT DOCUMENTS

| | | | |
|---|---|---|---|
| 7,668,128 B1 | 2/2010 | Benveniste | |
| 8,214,653 B1 | 7/2012 | Marr et al. | |
| 8,259,682 B2* | 9/2012 | Dutta | H04L 63/062 |
| | | | 370/331 |
| 9,525,759 B2 | 12/2016 | Zhang et al. | |
| 10,133,867 B1 | 11/2018 | Brandwine et al. | |
| 10,142,444 B2* | 11/2018 | Reynolds | H04W 84/18 |
| 10,257,868 B2* | 4/2019 | Wang | H04W 12/06 |
| 10,484,980 B1 | 11/2019 | Jiang et al. | |
| 10,750,415 B2* | 8/2020 | Hirudayaraj | H04W 8/02 |
| 10,785,718 B2* | 9/2020 | Li | H04W 52/0274 |
| 10,798,702 B2* | 10/2020 | Amini | G06F 8/65 |
| 2001/0002486 A1 | 5/2001 | Kocher et al. | |
| 2004/0117626 A1 | 6/2004 | Andreasyan | |
| 2004/0218683 A1 | 11/2004 | Batra et al. | |
| 2005/0233693 A1 | 10/2005 | Karaoguz et al. | |
| 2005/0243765 A1* | 11/2005 | Schrader | H04L 41/00 |
| | | | 370/328 |
| 2007/0064609 A1 | 3/2007 | Igarashi | |
| 2008/0065816 A1 | 3/2008 | Seo | |
| 2008/0076392 A1 | 3/2008 | Khetawat et al. | |
| 2008/0076393 A1 | 3/2008 | Khetawat et al. | |
| 2008/0076412 A1 | 3/2008 | Khetawat et al. | |
| 2008/0080414 A1 | 4/2008 | Thubert et al. | |
| 2009/0165086 A1 | 6/2009 | Trichina et al. | |
| 2009/0214036 A1 | 8/2009 | Shen et al. | |
| 2009/0320110 A1 | 12/2009 | Nicolson et al. | |
| 2010/0135201 A1 | 6/2010 | Lewis et al. | |
| 2010/0182959 A1 | 7/2010 | Cook et al. | |
| 2010/0190457 A1 | 7/2010 | Tu et al. | |
| 2011/0010543 A1 | 1/2011 | Schmidt et al. | |
| 2011/0041003 A1 | 2/2011 | Pattar et al. | |
| 2011/0087887 A1 | 4/2011 | Schmidt et al. | |
| 2011/0173457 A1 | 7/2011 | Reh | |
| 2012/0005369 A1* | 1/2012 | Capone | H04L 69/161 |
| | | | 709/236 |
| 2012/0005480 A1 | 1/2012 | Batke et al. | |
| 2013/0185563 A1 | 7/2013 | Djabarov et al. | |
| 2013/0198838 A1 | 8/2013 | Schmidt et al. | |
| 2013/0268689 A1 | 10/2013 | Leucht-Roth | |
| 2014/0006787 A1 | 1/2014 | Measson et al. | |
| 2014/0119303 A1 | 5/2014 | Kwon et al. | |
| 2014/0123124 A1 | 5/2014 | Gray et al. | |
| 2014/0192785 A1 | 7/2014 | Gong | |
| 2015/0071307 A1 | 3/2015 | De Smet et al. | |
| 2015/0245182 A1 | 8/2015 | Scagnol et al. | |
| 2015/0261521 A1 | 9/2015 | Choi et al. | |
| 2015/0271017 A1 | 9/2015 | Seligson et al. | |
| 2015/0317481 A1 | 11/2015 | Gardner et al. | |
| 2015/0363576 A1 | 12/2015 | Medvinsky et al. | |
| 2015/0382328 A1 | 12/2015 | Jiang et al. | |
| 2016/0029356 A1* | 1/2016 | Bhanage | H04W 48/10 |
| | | | 370/329 |
| 2016/0036814 A1 | 2/2016 | Conrad et al. | |
| 2016/0036956 A1 | 2/2016 | Debates et al. | |
| 2016/0119052 A1 | 4/2016 | Frerking et al. | |
| 2016/0198350 A1 | 7/2016 | Lou et al. | |
| 2016/0212745 A1 | 7/2016 | Hiertz et al. | |
| 2016/0227440 A1 | 8/2016 | Forssell et al. | |
| 2016/0262160 A1 | 9/2016 | Mo | |
| 2016/0262163 A1 | 9/2016 | Gonzalez Garrido et al. | |
| 2016/0280370 A1 | 9/2016 | Canavor et al. | |
| 2016/0294829 A1 | 10/2016 | Angus | |
| 2016/0301566 A1 | 10/2016 | Ramasubramani et al. | |
| 2016/0366229 A1 | 12/2016 | Yamaura et al. | |
| 2017/0026966 A1* | 1/2017 | Gao | H04J 3/0641 |
| 2017/0086152 A1 | 3/2017 | Li et al. | |
| 2017/0090909 A1 | 3/2017 | Guo et al. | |
| 2017/0093645 A1* | 3/2017 | Zhong | G06F 3/0482 |
| 2017/0093800 A1 | 3/2017 | Wiseman et al. | |
| 2017/0104580 A1 | 4/2017 | Wooten et al. | |
| 2017/0118198 A1 | 4/2017 | Cuff et al. | |
| 2017/0126411 A1 | 5/2017 | Piqueras et al. | |
| 2017/0187537 A1 | 6/2017 | Kim et al. | |
| 2017/0195459 A1 | 7/2017 | E Costa et al. | |
| 2017/0201499 A1 | 7/2017 | Mclaughlin et al. | |
| 2017/0208418 A1 | 7/2017 | Conan et al. | |
| 2017/0249135 A1 | 8/2017 | Gandhi et al. | |
| 2017/0265066 A1 | 9/2017 | Vyas et al. | |
| 2017/0310655 A1 | 10/2017 | Sethi et al. | |
| 2017/0331670 A1 | 11/2017 | Parkvall et al. | |
| 2017/0359190 A1 | 12/2017 | Nadathur et al. | |
| 2018/0054492 A1 | 2/2018 | Kim et al. | |
| 2018/0091315 A1 | 3/2018 | Singhal et al. | |
| 2018/0098263 A1 | 4/2018 | Luo et al. | |
| 2018/0183603 A1 | 6/2018 | Liu et al. | |
| 2018/0183723 A1 | 6/2018 | Cariou et al. | |
| 2018/0196945 A1 | 7/2018 | Kornegay et al. | |
| 2018/0239897 A1 | 8/2018 | Ventura | |
| 2018/0278625 A1 | 9/2018 | Cammarota et al. | |
| 2018/0278697 A1 | 9/2018 | Cariou et al. | |

FOREIGN PATENT DOCUMENTS

| | | |
|---|---|---|
| CN | 101442402 A | 5/2009 |
| CN | 102291794 A | 12/2011 |
| CN | 103067095 A | 4/2013 |
| CN | 103167631 A | 6/2013 |
| CN | 103460666 A | 12/2013 |
| CN | 103648109 A | 3/2014 |
| CN | 104796355 A | 7/2015 |
| CN | 104955102 A | 9/2015 |
| CN | 105050081 A | 11/2015 |
| CN | 106102074 A | 11/2016 |

(56) References Cited

FOREIGN PATENT DOCUMENTS

| | | |
|---|---|---|
| CN | 106575324 A | 4/2017 |
| CN | 107864490 A | 3/2018 |
| WO | 2016162763 A1 | 10/2016 |

* cited by examiner

Host Table

| Destination Mac Address | Port Number | Aging Timer |
|---|---|---|
| 00:11:22:33:44:55 | 2 | 8.01 |
| 22:11:33:44:55 | 1 | 2.1 |

Wifi or Ethernet Table

| Source Mac Address | Forwarding Mac Address | Aging Timer |
|---|---|---|
| 00:11:22:33:44:55 | 01:02:22:33:44:55 | 12.6 |
| 22:11:33:44:55 | 02:03:22:33:44:66 | 0.6 |

FIG. 5
(Prior Art)

Beacon Frame format of 802.11

General format of Information Element

```
struct vendor_custom_IE_topology
{
    unsigned int8 id; /*221*/
    unsigned int8 len;
    unsigned int8 oui[3]; /*
    unsigned int8 ntgr_vendor_ie_flag[5];
};
```

Flag definition for each character.

| Character | Bit | Description |
|---|---|---|
| 0 | 0 | DWDS supportability |
| 0 | 1 | Mesh supportability |
| 0 | 2-7 | Reserved |
| 1 | 0-7 | Represent product types. |
| 3 | 0-23 | Represent Topology change |

FIG. 11

METHOD AND APPARATUS FOR GENERATING AND MAINTAINING AN ACCURATE NETWORK MAP IN A COMMUNICATIONS NETWORK

CROSS REFERENCE TO RELATED APPLICATIONS

This application claims priority to U.S. provisional patent application Ser. No. 62/488,258, filed Apr. 21, 2017, which application is incorporated herein in its entirety by this reference thereto.

FIELD

The invention relates to communications networks. More particularly, the invention relates to a method and apparatus for generating and maintaining an accurate network map in a communications network.

BACKGROUND

IEEE 802.11ai is a wireless LAN study group in the IEEE that is planning to standardize a fast, initial link setup function that would enable a wireless LAN client to achieve a secure link setup within 100 ms. IEEE 802.11ai addresses challenges where a large number of mobile users are continually entering and leaving an existing extended service set (ESS) coverage area. The amendment provides scalability for a high number of users simultaneously entering an ESS, minimizes time spent initializing a link, and provides secure authentication. In effect, IEEE 802.11ai significantly improves user connectivity in high-density environments, such as arenas, stadiums, airports, shopping malls, etc., as well as for automotive systems, allowing for a more secure and reliable connection, and enabling more efficient spectrum use by optimizing the protocol overhead in high-density user environments.

A problem with protocols, such as 802.11ai, occurs in distributed networks, such as a multi-AP system, when a client roams from one AP to another AP or when the network topology changes. In such case, the network may not be updated within the time taken to setup a link to the new AP. In such case, packets for the client may be directed to the old AP and therefore lost because the client is now linked with the new AP. This can result in a lost connection for the client.

For example, FIG. 1 is a schematic representation of client roaming in a tree structure network topology having several APs that exchange information in connection with a router 10. In FIG. 1, when the client 14 roams from AP B 12 to AP D 13 an update must be sent from AP B to AP D notifying AP D of the change. However, to do so AP B must forward the update through the tree structure of the network, i.e. via AP C et al and then back down the tree to AP D. This is time consuming. Communications directly between AP B and AP D may be permitted for management purposes, but would not occur within the 100 ms link time of the client under 802.11ai.

802.11r Fast Transition (FT) Roaming defines a procedure for the initial handshake with the new AP even before the client roams to the target AP, which is called Fast Transition (FT). IEEE 802.11r specifies Fast Basic Service Set (BSS) transitions between access points by redefining the security key negotiation protocol, allowing both the negotiation and requests for wireless resources to occur in parallel. Moreover, 802.11r defines solutions to allow for the part of the key derived from the server to be cached in the wireless network, so that a reasonable number of future connections can be based on the cached key, avoiding the 802.1X process. Using 802.11r, 802.11ai, and other protocols clients have become more aggressive in roaming.

FIG. 2 is a second schematic representation of topology change in a tree structure network topology having several APs that exchange information in connection with a router 20; one or more clients 21 are connected to an AP. These clients may be any of Ethernet, wireless, etc. clients. In FIG. 2, the original network topology, shown on the left side of FIG. 2, changes, as shown on the right side of FIG. 2. In such topology change, AP A 22 moves from AP C 24 to AP D 25. Here, the router must send a packet for AP B 23 client via AP D instead of AP C. Again, management of the topology in connection with 802.11ai protocol delays packet delivery and can result in dropped packets, given the 100 ms link establishment in 802.11ai.

FIG. 3 is a schematic representation of a network device showing the number of tables to be updated when effecting a rapid topology change. In FIG. 3, an incoming packet 31 is received by the device 30 at a Pin port 32. Receipt of the packet updates the host bridge table 34 and Wi-Fi bridge table (also known as the WDS table) and is transmitted to the destination. Respective bridge tables 36 are maintained in the host CPU 34 for each port p0, p2, p3, (38) each of which is connected to further devices via the network, each of which maintain a bridge table, such as for Ethernet and Wi-Fi. Unfortunately, there Is no standard way to update all of these tables.

FIG. 4 is a schematic representation of a network device showing in greater detail the several bridge tables that are maintained across multiple network devices. In FIG. 4, a source packet 41 is received at Pin of device U1 30, which is a host device having a CPU that maintains a bridge table 36, as discussed above in connection with FIG. 3. Device U1 also has an entry in the bridge table for a Wi-Fi connection to device U2 40. Device U2 has a CPU that maintains a bridge table 42 in which there is a Wi-Fi entry for device U1. Further, device U2 maintains a bridge table entry for a Wi-Fi connection to device U3 44. Device U3 maintain a bridge table 46 having an entry for a Wi-Fi connection to device U2, as well as for an Ethernet connection to a destination 43 for the packet.

FIG. 5 shows an example host table and a Wi-Fi or Ethernet table. In some cases, it may take up to the timeout of an aging timer before the table is updated. For example, the Host Table shows aging times of 8.01 and 2.1 and the Wi-Fi/Ethernet table shows aging times pf 12.6 and 6. The aging timer determines the number of seconds that an entry is kept in the table. This delay is a concern because, in an 802.11ai environment, table entries must be added and removed proactively, and cannot wait for various timeouts if the link setup is to occur within the specified 100 ms.

SUMMARY

Layer 2 refers to the Data Link layer of the commonly-referenced multilayered communication model, Open Systems Interconnection (OSI). The Data Link layer is concerned with moving data across the physical links in the network. Embodiments of the invention provide a Layer 2 and management modification to provide and maintain an accurate network map. Embodiments of the invention modify Layer 2 functionality to work with a multi-AP system without central management or with central management, and modify management frames to update the network map quickly when the client roams or when topology changes.

BRIEF DESCRIPTION OF THE DRAWINGS

FIG. 5 shows an example host table and a Wi-Fi or Ethernet table;

FIG. 11 provides a definition of an information element and a flag definition for each character according to the invention;

DESCRIPTION

Figure 6:
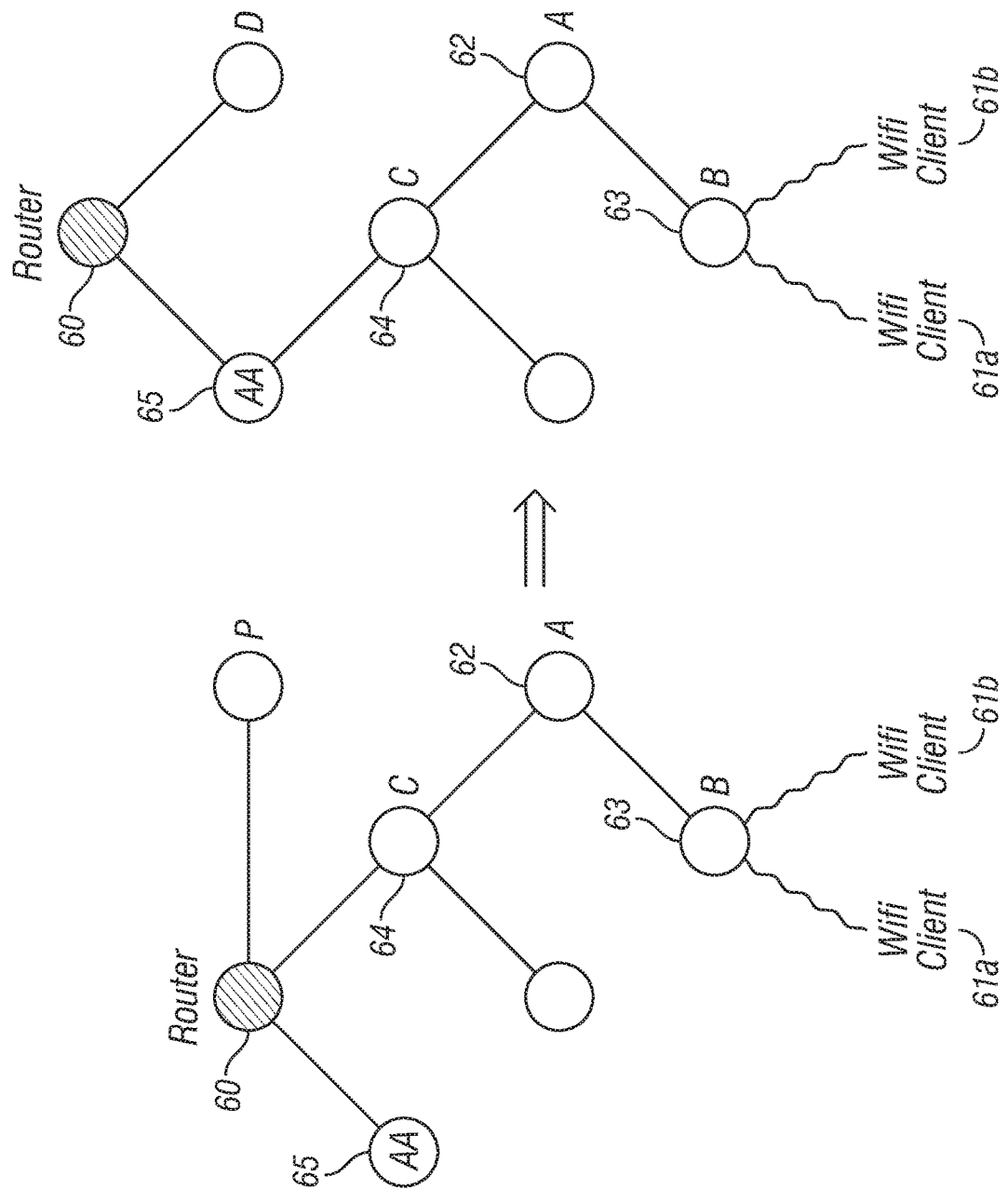
FIG. 6 is a schematic representation of network map update during client roaming after a network topology change according to the invention.

Embodiments of the invention track client movement and topology changes via a network map. FIG. 6 is a schematic representation of network map update during client roaming after a network topology change according to the invention. The network of FIG. 6 comprises a router 60 and multiple clients 61a, 61b connected for communications over the network via a plurality of APs 62-65. The clients may comprise any of wireless and Ethernet clients, for example. In FIG. 6, the original network topology, shown on the left side of FIG. 6, changes, as shown on the right side of FIG. 6.

Figure 1:
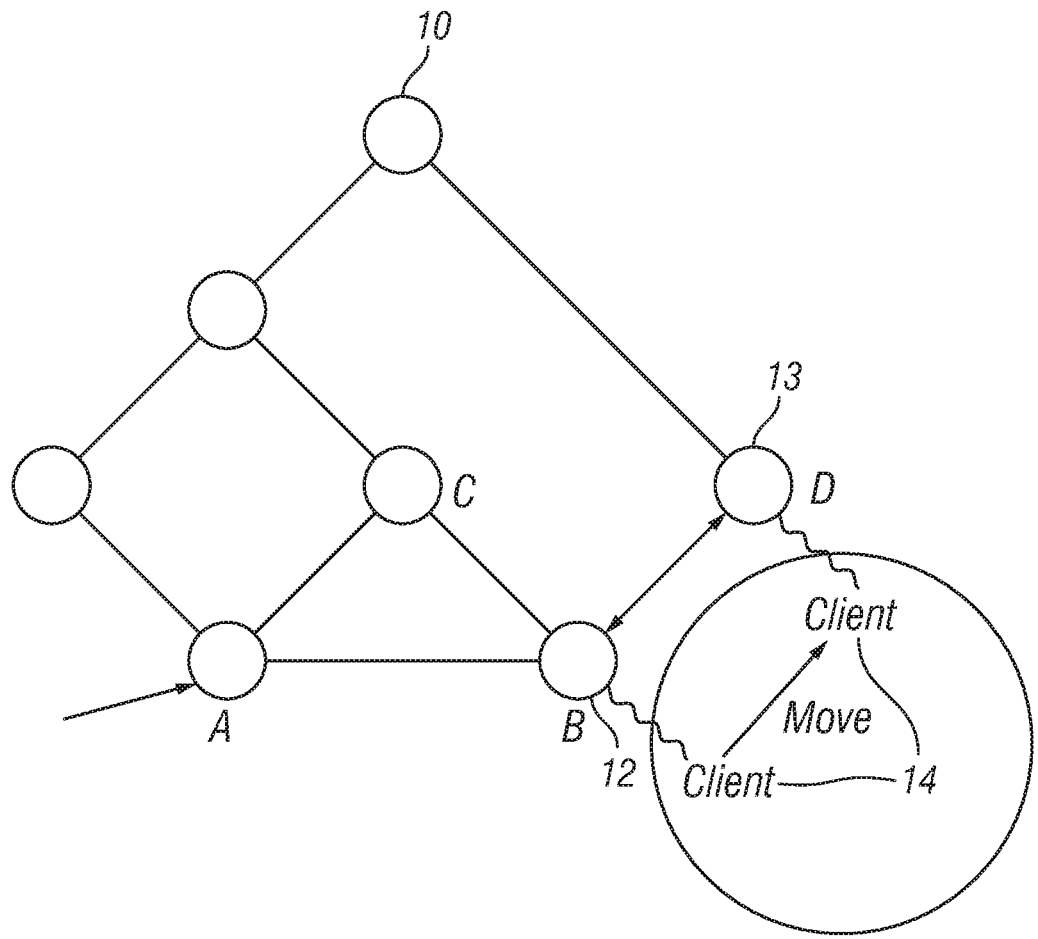
FIG. 1 is a schematic representation of client roaming in a tree structure network topology.
Figure 2:
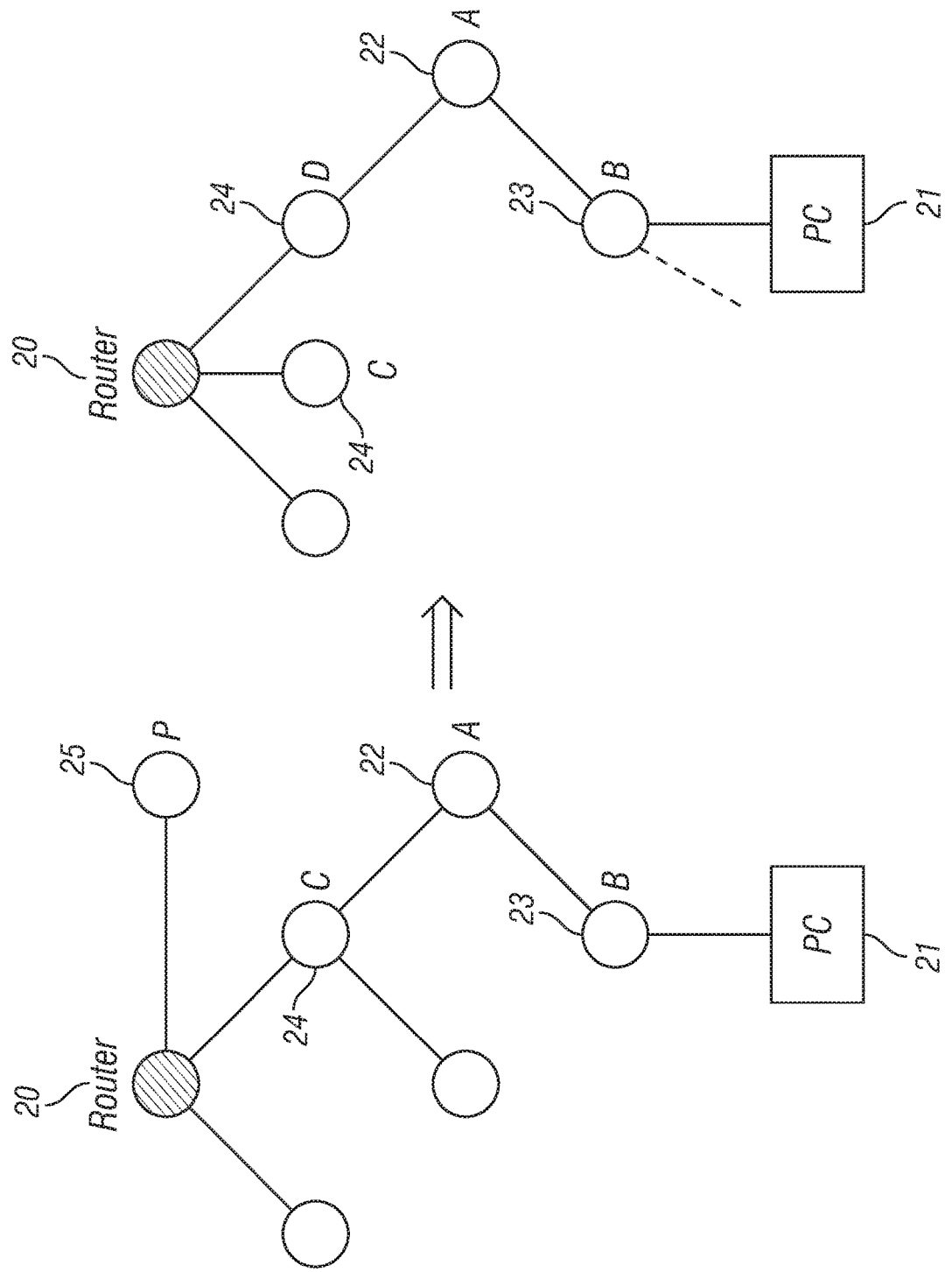
FIG. 2 is a second schematic representation of topology change in a tree structure network topology.
Figure 3:
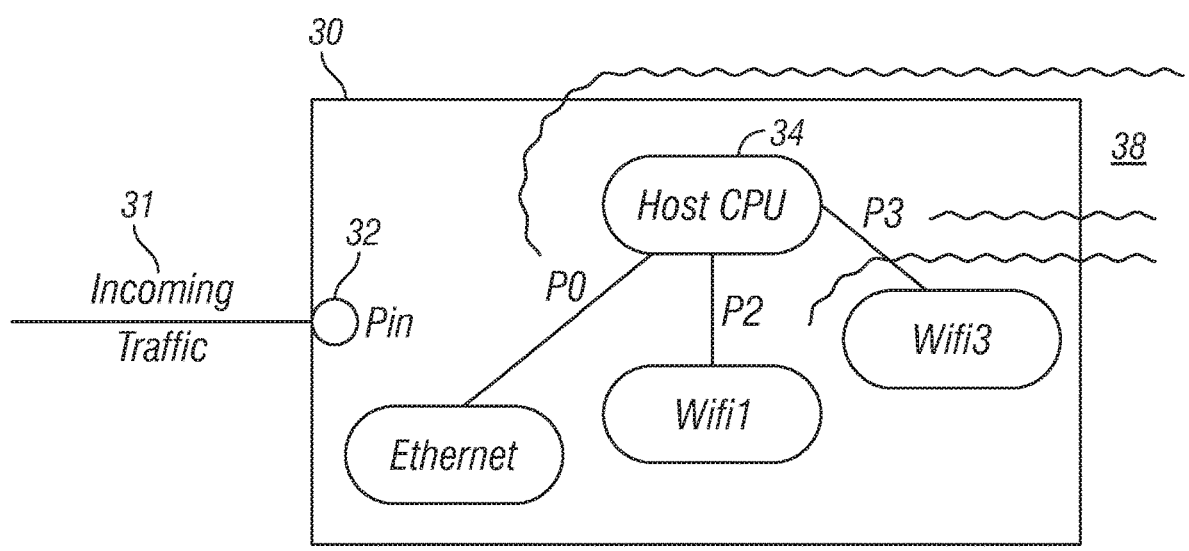
FIG. 3 is a schematic representation of a network device showing the number of tables to be updated when effecting a rapid topology change.
Figure 4:
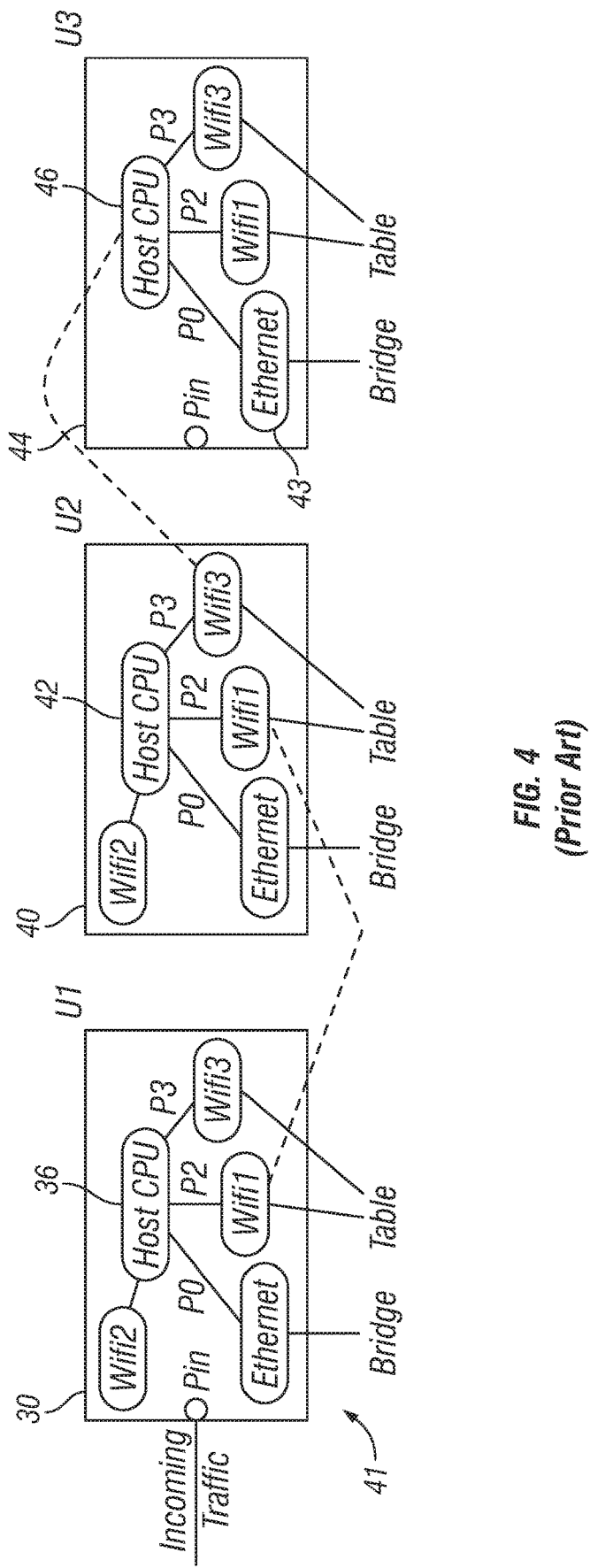
FIG. 4 is a schematic representation of a network device showing in greater detail the several bridge tables that are maintained across multiple network devices.

In FIG. 6, a network map is created and is updated after the topology change similar to that discussed above in connection with FIG. 2. Thus, the router now knows that the client associated with AP B 63 is directly accessed via AP A 62 and AP C 64 and via a further connection to AP AA 65. Absent such map, the router would send packets for the client via AP C and not via now intervening AP AA. In such case, the packet would not be delivered to the client, resulting in a dropped connection.

In embodiment of the invention, the network map is comprised of one or more tables within the network devices. Topology change effects updates to these tables. Previous approaches relied on the client or AP device to send packets. The results with such approaches are not predictable.

In embodiments of the invention, strategies for updating such tables, for example in a Netgear Orbi device, include:

The AP sends a Unicast, multicast packet, i.e. a fake packet, on behalf of a client that has roamed.

The AP sends a fake packet to the AP that hosted the client and all other upstream APs.

A management entity is added on top of layer 2 to address table updates.

Note that IEEE 1905 is used in some cases, but it is not sufficient for 802.11ai applications.

Additions to the network, such as when a client connects and disconnects, effect explicit updates instead of topology change notifications.

Updates may be sent directly to APs that were on the client path to network resources.

In embodiments of the invention, in which a management entity is not used (see FIG. 6), AP B 63 sends a multicast level 2 packet with the MAC address of the roaming client, e.g. client 61a, 61b.

In embodiments of the invention, in which a management entity is used, (see FIG. 6), AP B 63 tells AP A 62 and AP C 64 that it has the client. In this case, AP A and AP C update their host table and WDS table: old entries are removed and new entries are added. Such updates can also be made to the host OS table, off load CPU/MPU tables, and Wi-Fi firmware tables.

Layer 2 refers to the Data Link layer of the commonly-referenced multilayered communication model, Open Systems Interconnection (OSI). The Data Link layer is concerned with moving data across the physical links in the network. At OSI model, Layer 2, data packets are encoded and decoded into bits. Layer 2 furnishes transmission protocol knowledge and management and handles errors in the physical layer, flow control, and frame synchronization. The data link layer is divided into two sub layers: The Media Access Control (MAC) layer and the Logical Link Control (LLC) layer. The MAC sub layer controls how a computer on the network gains access to the data and permission to transmit it. The LLC layer controls frame synchronization, flow control, and error checking.

Embodiments of the invention use a Layer 2 and management modification to provide and maintain an accurate network map. Embodiments of the invention modify Layer 2 functionality to work with a multi-AP system without central management or with central management, and modify management frames to quickly update the network map when the client roams or when topology changes.

Figure 7:
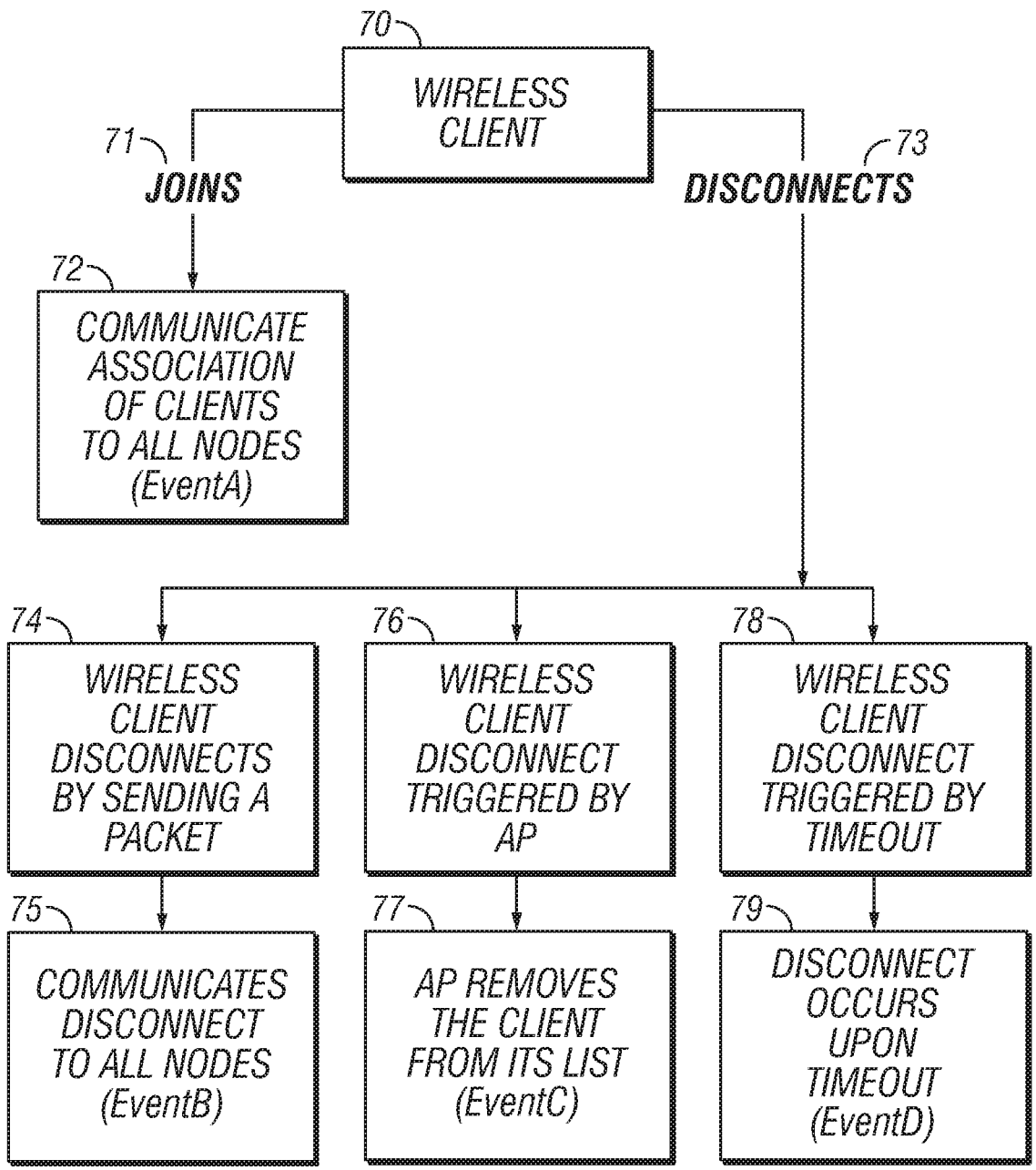
FIG. 7 is a flow diagram showing a client joining and disconnecting from a network according to the invention.

FIG. 7 is a flow diagram showing a client joining and disconnecting from a network according to the invention. In embodiments of the invention, when a wireless client 70 joins 71, the association of the client is communicated to all nodes directly (EventA) 72. Event A is time stamped with an accurate time stamp, communicated using robust data rates over a wireless connection, and may be sent using TCP/IP or higher layer protocols.

When a wireless client is disconnected 73, if the client disconnects by sending a packet (EventB) 74, the disconnect is communicated by all APs 75. EventB may be communicated using robust rates or robust protocols. If the client is removed from an AP triggered by the AP (EventC) 76, the communicating happens once the AP removes the client from its list 77. If the client association times out by the AP (EventD) 78, communication happens when timeout is triggered 79.

Figure 8:
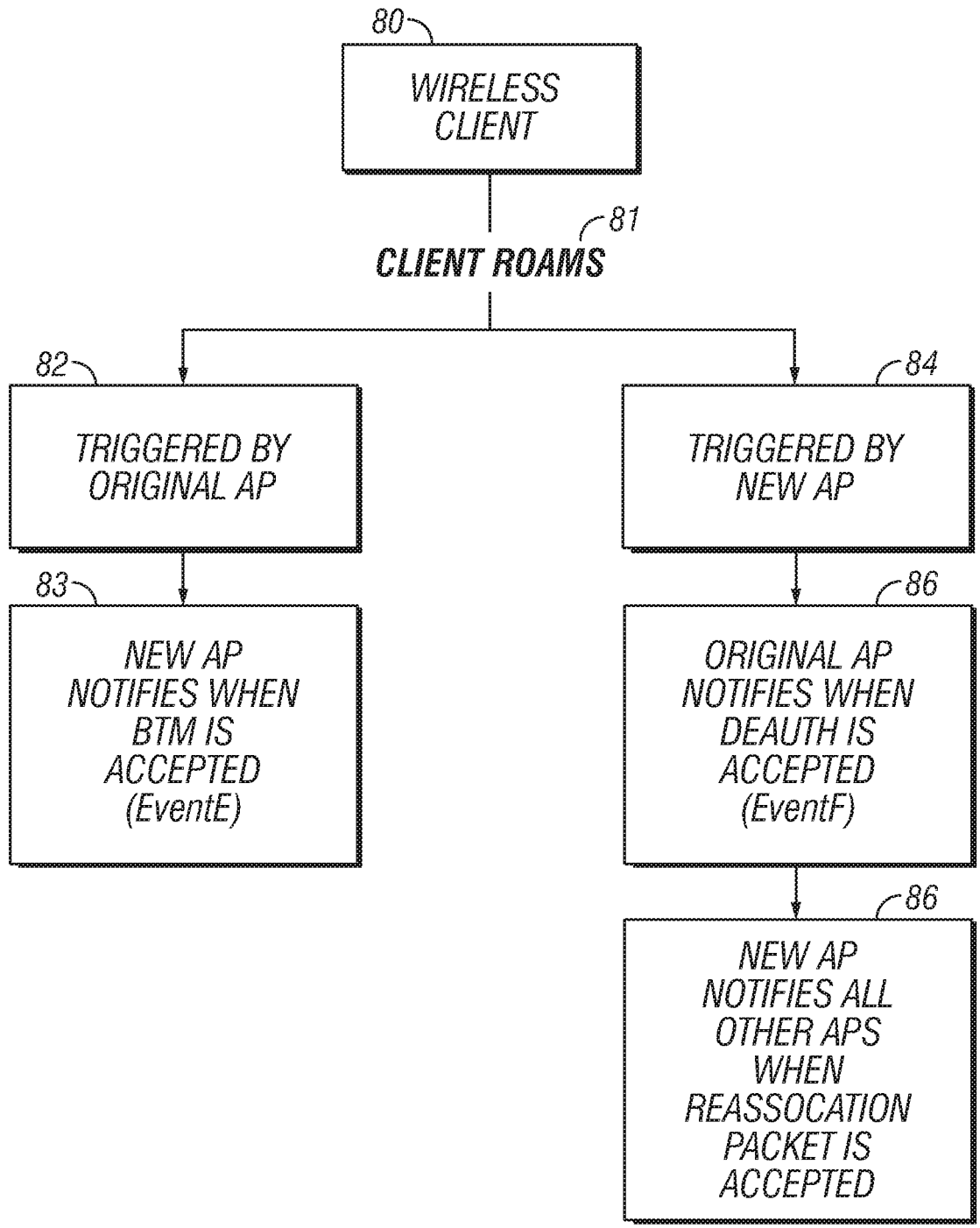
FIG. 8 is a flow diagram showing client roaming according to the invention.

FIG. 8 is a flow diagram showing client roaming according to the invention. When a wireless client 80 roams 81, if roaming is triggered by the original AP 82, the new AP can provide a notification when basic service set transition management (BTM) is accepted (EventE) 83. Alternatively, if roaming is triggered by the new AP 84, the original AP can provide a notification when deauth is accepted (EventF) 85. The new AP notifies all of the other APs when it receives a reassociation packet 86.

Figure 9:
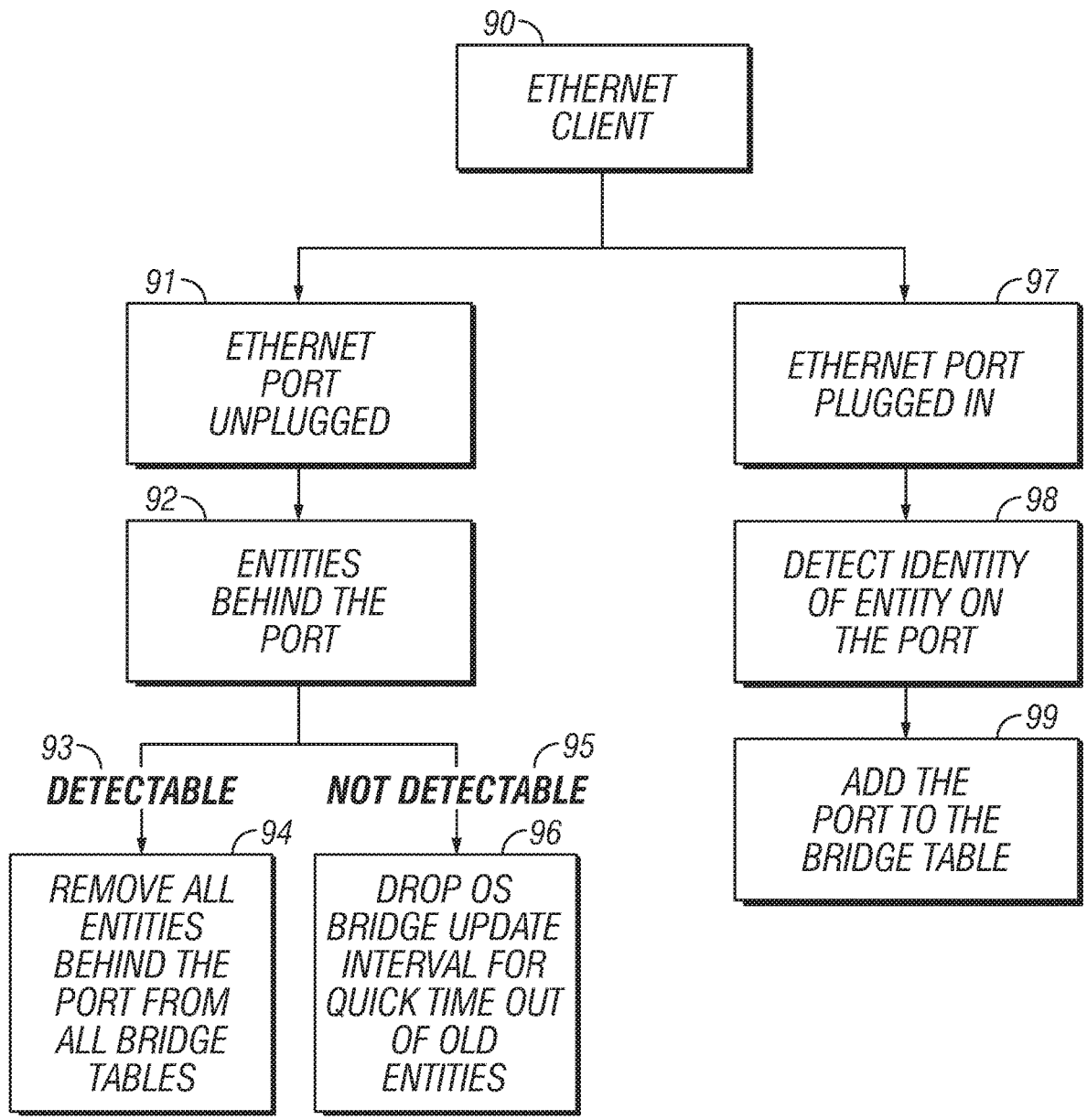
FIG. 9 is a flow diagram showing Ethernet clients roaming according to the invention.

FIG. 9 is a flow diagram showing Ethernet clients roaming according to the invention. When Ethernet clients 90 roam, e.g. when an Ethernet port is unplugged 91, if what is behind the port is detectable 93, all of what is behind that port is removed from all bridge tables 94. If what is behind the port is not detectable 95, the bridge update interval in the operating system is reduced for some time to allow old entities to time out quickly 66. When an Ethernet port is plugged in to the port 97, the identity of what is on the port may be detected 98 before adding the port to the bridge table for the other part of network into which it is bridged 99.

A hotplug event, which is kernel detection against the hardware, may be used. Hotplug lets a user plug in new devices and use them immediately. Accordingly, users do not need to learn much system administration because systems at least partially autoconfigure themselves. Once the cable is plugged in and an OS event is triggered, an update to all Ethernet devices may be triggered by sending layer 2 packets or by timing out the entries in forwarding tables.

When topology changes in a multi-AP network it is key to update entries for all APs, wired clients behind each AP, and wireless clients behind each AP. The entry update may be done proactively on all units, where each unit asks for an update for all wired and wireless clients, an update for a subset of wired and wireless clients, and by timing out entries quicker. The update may be triggered by the APs which decided to change the topology or the APs where their immediate neighbors have changed. The APs may broadcast or multicast again indicating what is connected to them. The APs may send a packet to each of the other APs and ask the other APs to rediscover all of the clients that are connected to them.

Time Stamp/Sequence Number

All messages mentioned above may become timing critical, i.e. it is important in some cases for all nodes to know at the time that they receive a message when the message was created so they use the latest information. In embodiments of the invention, each AP maintains a timestamped client table. The timestamps can be established via timers in each AP, for example using the IEEE 802.11 time sync function (TSF). The TSF specified in IEEE 802.11 wireless local area network (WLAN) standard fulfills timing synchronization among users. The TSF keeps the timers for all stations in the same Basic Service Set (BSS) synchronized. In embodiments of the invention, all APs maintain a local TSF timer. Timing synchronization is achieved by APs periodically exchanging timing information through beacon frames. In BSS, the AP sends the TSF information in the beacons. Each AP maintains a TSF timer counting in increments of microseconds (µs). APs adopt a received timing if it is later than the AP's own TSF timer.

Various techniques may be used such that all multiple units have synchronized time stamps or sequence numbers. In embodiments of the invention, the following may be used: a timing synchronization function (TSF) timer from IEEE 802.11 beacons, network time protocol (NTP) time, fine timing measurements as defined in IEEE 802.11 REVmc, timing measurement procedure defined in 802.11v, IEEE 1588, or any other methods. In some embodiments, a beacon frame may be used to signal that topology has changed. Information elements may be added to beacon where topology information may be embedded in the beacon.

Figure 10:
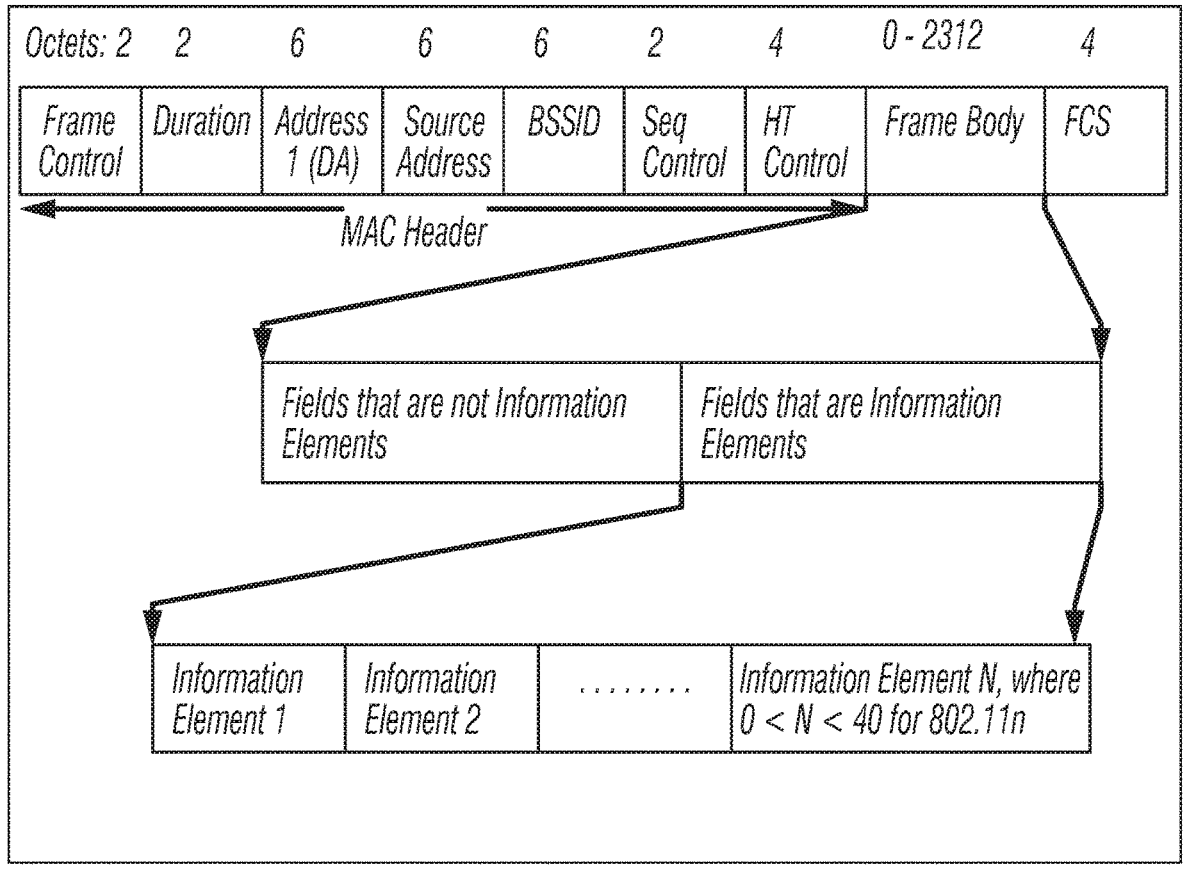
FIG. 10 shows a general beacon structure and the general format of an information element according to the invention.
Figure 10:
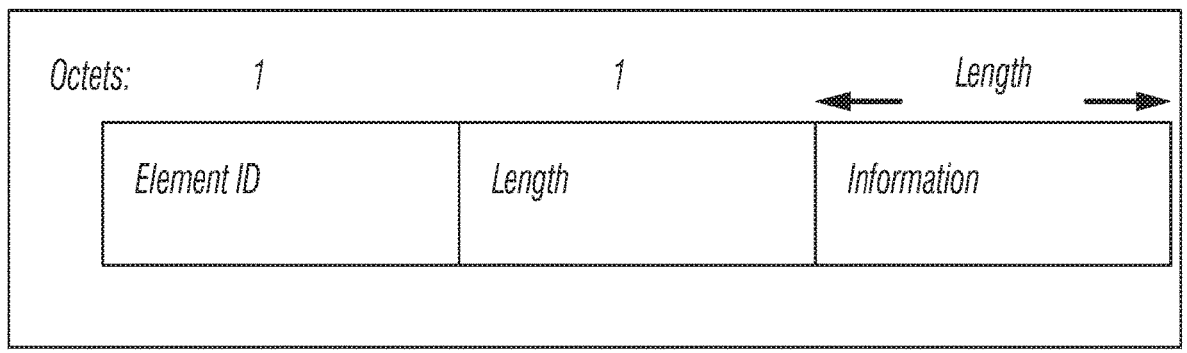

FIG. 10 shows a general beacon structure and the general format of an information element according to the invention.

FIG. 11 provides a definition of an information element and a flag definition for each character according to the invention.

Embodiments of the invention add a topology update message, for example to the beacon frames, or to IEEE 1905.1 data frames, or via BLE. The timer in the client can be GPS synched and/or synched to a cellular base station. In some embodiments, the clients are GPS time synched and this time is sent to the APs in an association message, which provides the time to be used by the APs. In other embodiments, the APs include a GPS or cellular based timer. In any event, precise timing is critical to proper operation of the invention and local network time is generally inaccurate for such purposes. To overcome this, some embodiments of the invention may establish a master-slave relationship between the APs, where certain APs, i.e. masters, provide time for time stamp purposes.

Further, in some embodiments the router could send packets to two or more APs and both APs could try to connect to the client. In this way, a dropped connection is less likely because the client would connect to one or the other of the two or more APs.

Figure 12:
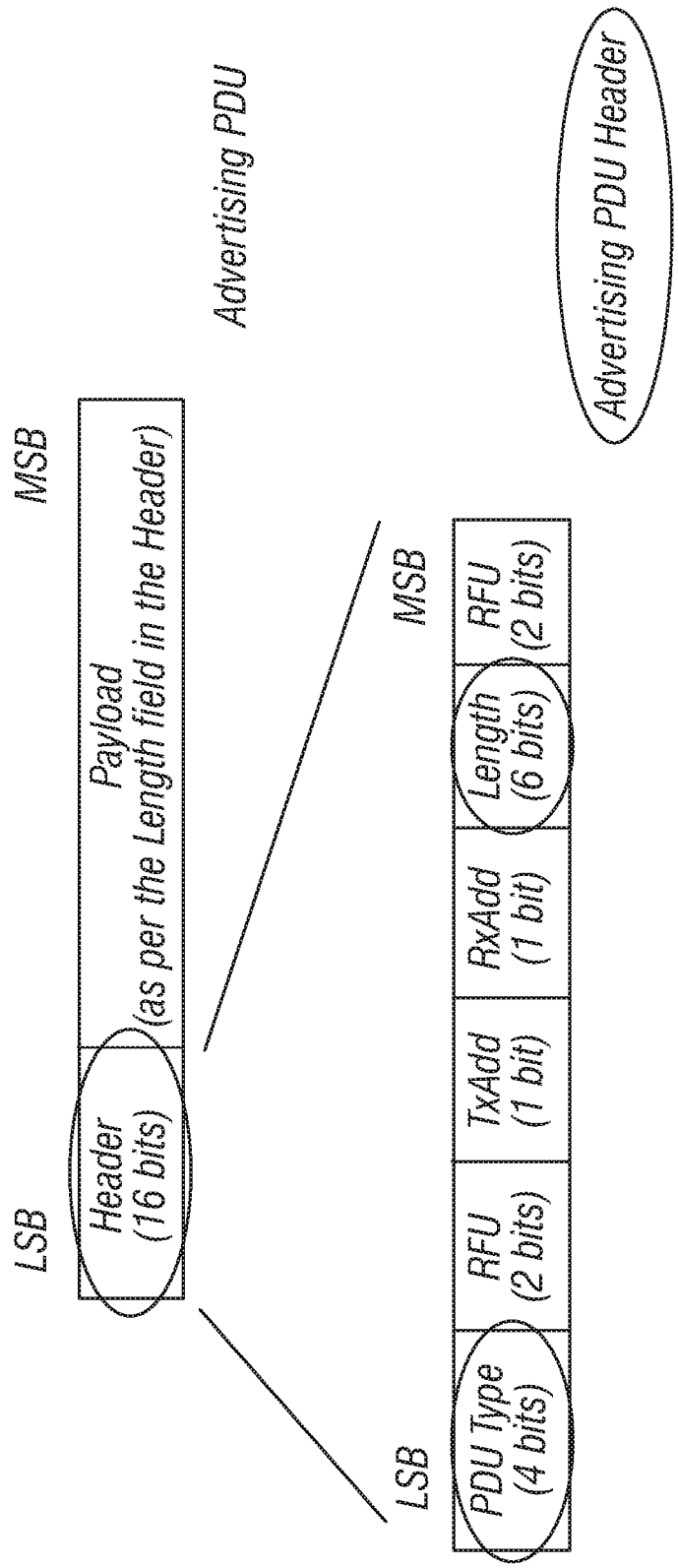
FIG. 12 shows how a payload of the advertising frame in BLE may be used to indicate network map.

In still other embodiments, Bluetooth could be used to localize and triangulate with regard to a client, and the Bluetooth information and 802.11 beacon time could be combined with regard to the topology update message. For example, a Bluetooth low energy periodic advertisement may be used as a periodic signal to send a one way signal about which client is to associate. The payload of the advertising frame in BLE as depicted in FIG. 12 may be used to indicate network map. The BLE advertising may be used to broadcast information without creating a connection and, as result it, does not create much of overheard for BLE on different mesh units.

Table 1 below shows an example of a Linux bridge table forwarding to a port.

TABLE 1

| Linux Bridge Table root@RBR50:/# brctl show | | | |
|---|---|---|---|
| bridge name | bridge id | STP enabled | interfaces |
| br0 | 8000.08028e93506c | no | ath0 |
|  |  |  | ath01 |
|  |  |  | ath1 |
|  |  |  | ath2 |
|  |  |  | eth1 |
| brwan | 8000.08028e93506d | no | eth0 |

Table 2 below is a command showing the bridge details of br0. The aging timer of the following may be modified by using "brctl setageing <bridge> <time> set ageing time"

to force an update.

TABLE 2

| Bridge Details of br0 root@RBR50:/# brctl showstp br0 | | | |
|---|---|---|---|
| br0 | | | |
| bridge id | 8000.08028e93506c | | |
| designated root | 8000.08028e93506c | | |
| root port | 0 | path cost | 0 |
| max age | 20.00 | bridge max age | 20.00 |
| hello time | 2.00 | bridge hello time | 2.00 |
| forward delay | 0.00 | bridge forward delay | 0.00 |
| ageing time | 300.00 | hello timer | 0.04 |
| | | tcn timer | 0.00 |
| | | topology change timer | 0.00 |
| | | gc timer | 141.52 |
| flags | | | |
| ath0 (2) | | | |
| port id | 8002 | state | forwarding |
| designated root | 8000.08028e93506c | path cost | 100 |
| designated bridge | 8000.08028e93506c | message age timer | 0.00 |
| designated port | 8002 | forward delay timer | 0.00 |
| designated cost | 0 | hold timer | 0.00 |
| flags | | | |
| hairpin mode | 1 | | |
| ath01 (3) | | | |
| port id | 8003 | state | forwarding |
| designated root | 8000.08028e93506c | path cost | 100 |
| designated bridge | 8000.08028e93506c | message age timer | 0.00 |
| designated port | 8003 | forward delay timer | 0.00 |
| designated cost | 0 | hold timer | 0.00 |
| flags | | | |
| hairpin mode | 1 | | |
| ath1 (4) | | | |
| port id | 8004 | state | forwarding |
| designated root | 8000.08028e93506c | path cost | 100 |
| designated bridge | 8000.08028e93506c | message age timer | 0.00 |
| designated port | 8004 | forward delay timer | 0.00 |
| designated cost | 0 | hold timer | 0.00 |
| flags | | | |
| hairpin mode | 1 | | |
| ath2 (5) | | | |
| port id | 8005 | state | forwarding |
| designated root | 8000.08028e93506c | path cost | 100 |
| designated bridge | 8000.08028e93506c | message age timer | 0.00 |
| designated port | 8005 | forward delay timer | 0.00 |
| designated cost | 0 | hold timer | 1.00 |
| flags | | | |
| hairpin mode | 1 | | |
| eth1 (1) | | | |
| port id | 8001 | state | forwarding |
| designated root | 8000.08028e93506c | path cost | 4 |
| designated bridge | 8000.08028e93506c | message age timer | 0.00 |
| designated port | 8001 | forward delay timer | 0.00 |
| designated cost | 0 | hold timer | 0.99 |
| flags | | | |
| hairpin mode | 1 | | |

Table 3 below is a command showing the MAC addresses of br0.

TABLE 3

| Command Showing the MAC Addresses of br0. root@RBR50:/# root@RBR50:/# brctl showmacs br0 | | | |
|---|---|---|---|
| port no | mac addr | is local? | ageing timer |
| 4 | 00:03:7f:80:51:35 | no | 8.01 |
| 5 | 00:22:6c:87:cd:b2 | no | 0.10 |
| 5 | 08:02:8e:91:91:9a | no | 0.37 |
| 4 | 08:02:8e:93:50:6e | yes | 0.00 |
| 5 | 08:02:8e:93:50:6f | yes | 0.00 |
| 2 | 0e:02:8e:93:50:6c | yes | 0.00 |
| 5 | 10:02:b5:37:10:e0 | no | 0.01 |
| 3 | 12:02:8e:91:91:9a | no | 39.93 |
| 3 | 12:02:8e:93:50:6c | yes | 0.00 |
| 5 | 20:ab:37:5b:7d:b4 | no | 2.05 |
| 5 | 74:81:14:df:8c:7e | no | 55.75 |
| 5 | ac:37:43:a0:7f:04 | no | 6.19 |
| 4 | d8:0f:99:57:83:4f | no | 1.60 |
| 5 | dc:0c:5c:d0:59:ab | no | 25.40 |

Table 4 below is an Ifconfig showing various interfaces on an Orbi unit.

TABLE 4

| Ifconfig Showing Various Interfaces on an Orbi Unit root@RBR50:/# ifconfig | |
|---|---|
| ath0 | Link encap:Ethernet HWaddr 0E:02:8E:93:50:6C |
| | inet6 addr: fe80::c02:8eff:fe93:506c/64 Scope:Link |
| | UP BROADCAST RUNNING ALLMULTI MULTICAST MTU:1500 Metric:1 |
| | RX packets:22 errors:0 dropped:0 overruns:0 frame:0 |
| | TX packets:28 errors:0 dropped:0 overruns:0 carrier:0 |
| | collisions:0 txqueuelen:0 |
| | RX bytes:3595 (3.5 KiB) TX bytes:6594 (6.4 KiB) |
| ath01 | Link encap:Ethernet HWaddr 12:02:8E:93:50:6C |
| | inet6 addr: fe80::1002:8eff:fe93:506c/64 Scope:Link |
| | UP BROADCAST RUNNING ALLMULTI MULTICAST MTU:1500 Metric:1 |
| | RX packets:0 errors:0 dropped:0 overruns:0 frame:0 |
| | TX packets:6 errors:0 dropped:0 overruns:0 carrier:0 |
| | collisions:0 txqueuelen:0 |
| | RX bytes:0 (0.0 B) TX bytes:1384 (1.3 KiB) |

TABLE 4-continued

Ifconfig Showing Various Interfaces on an Orbi Unit
root@RBR50:/# ifconfig

| | |
|---|---|
| ath1 | Link encap:Ethernet HWaddr 08:02:8E:93:50:6E<br>inet6 addr: fe80::a02:8eff:fe93:506e/64 Scope:Link<br>UP BROADCAST RUNNING ALLMULTI MULTICAST MTU:1500 Metric:1<br>RX packets:3758 errors:0 dropped:0 overruns:0 frame:0<br>TX packets:4774 errors:43 dropped:0 overruns:0 carrier:0<br>collisions:0 txqueuelen:0<br>RX bytes:1092918 (1.0 MiB) TX bytes:2831348 (2.6 MiB) |
| ath2 | Link encap:Ethernet HWaddr 08:02:8E:93:50:6F<br>inet6 addr: fe80::a02:8eff:fe93:506f/64 Scope:Link<br>UP BROADCAST RUNNING ALLMULTI MULTICAST MTU:1500 Metric:1<br>RX packets:0 errors:0 dropped:0 overruns:0 frame:0<br>TX packets:0 errors:0 dropped:0 overruns:0 carrier:0<br>collisions:0 txqueuelen:0<br>RX bytes:0 (0.0 B) TX bytes:0 (0.0 B) |
| br0 | Link encap:Ethernet HWaddr 08:02:8E:93:50:6C<br>inet addr:192.168.1.1 Bcast:192.168.1.255 Mask:255.255.255.0<br>inet6 addr: fe80::a02:8eff:fe93:506c/64 Scope:Link<br>UP BROADCAST RUNNING MULTICAST MTU:1500 Metric:1<br>RX packets:42560629 errors:0 dropped:2 overruns:0 frame:0<br>TX packets:75404519 errors:0 dropped:0 overruns:0 carrier:0<br>collisions:0 txqueuelen:0<br>RX bytes:4451732546 (4.1 GiB) TX bytes:92294524425 (85.9 GiB) |
| brwan | Link encap:Ethernet HWaddr 08:02:8E:93:50:6D<br>inet addr:67.188.124.249 Bcast:255.255.255.255 Mask:255.255.252.0<br>inet6 addr: fe80::a02:8eff:fe93:506d/64 Scope:Link<br>UP BROADCAST RUNNING MULTICAST MTU:1500 Metric:1<br>RX packets:73234597 errors:0 dropped:0 overruns:0 frame:0<br>TX packets:37023119 errors:0 dropped:0 overruns:0 carrier:0<br>collisions:0 txqueuelen:0<br>RX bytes:90954007588 (84.7 GiB) TX bytes:4259110603 (3.9 GiB) |
| eth0 | Link encap:Ethernet HWaddr 08:02:8E:93:50:6D<br>inet6 addr: fe80::a02:8eff:fe93:506d/64 Scope:Link<br>UP BROADCAST RUNNING MULTICAST MTU:1500 Metric:1<br>RX packets:73232432 errors:0 dropped:2 overruns:0 frame:0<br>TX packets:36943560 errors:0 dropped:0 overruns:0 carrier:0<br>collisions:0 txqueuelen:1000<br>RX bytes:1783829250 (1.6 GiB) TX bytes:4245789565 (3.9 GiB) |
| eth1 | Link encap:Ethernet HWaddr 08:02:8E:93:50:6C<br>inet6 addr: fe80::a02:8eff:fe93:506c/64 Scope:Link<br>UP BROADCAST RUNNING ALLMULTI MULTICAST MTU:1500 Metric:1<br>RX packets:0 errors:0 dropped:0 overruns:0 frame:0<br>TX packets:932784 errors:0 dropped:0 overruns:0 carrier:0<br>collisions:0 txqueuelen:1000<br>RX bytes:0 (0.0 B) TX bytes:158366590 (151.0 MiB) |
| lo | Link encap:Local Loopback<br>inet addr:127.0.0.1 Mask:255.0.0.0<br>inet6 addr: ::1/128 Scope:Host<br>UP LOOPBACK RUNNING MTU:65536 Metric:1<br>RX packets:60399154 errors:0 dropped:0 overruns:0 frame:0<br>TX packets:60399154 errors:0 dropped:0 overruns:0 carrier:0<br>collisions:0 txqueuelen:0<br>RX bytes:3244991878 (3.0 GiB) TX bytes:3244991878 (3.0 GiB) |
| wifi0 | Link encap:Ethernet HWaddr 0E:02:8E:93:50:6C<br>UP BROADCAST RUNNING MULTICAST MTU:1500 Metric:1<br>RX packets:1566825 errors:0 dropped:0 overruns:0 frame:0<br>TX packets:6233804 errors:0 dropped:0 overruns:0 carrier:0<br>collisions:0 txqueuelen:2699<br>RX bytes:205901830 (196.3 MiB) TX bytes:2854921702 (2.6 GiB)<br>Interrupt:200 |
| wifi1 | Link encap:Ethernet HWaddr 08:02:8E:93:50:6E<br>UP BROADCAST RUNNING MULTICAST MTU:1500 Metric:1<br>RX packets:5785780 errors:0 dropped:0 overruns:0 frame:0<br>TX packets:9195027 errors:0 dropped:0 overruns:0 carrier:0<br>collisions:0 txqueuelen:2699<br>RX bytes:1104847990 (1.0 GiB) TX bytes:1547120443 (1.4 GiB)<br>Interrupt:201 |
| wifi2 | Link encap:Ethernet HWaddr 08:02:8E:93:50:6F<br>UP BROADCAST RUNNING MULTICAST MTU:1500 Metric:1<br>RX packets:40166087 errors:0 dropped:0 overruns:0 frame:0<br>TX packets:68807407 errors:0 dropped:0 overruns:0 carrier:0<br>collisions:0 txqueuelen:2699<br>RX bytes:370961405 (353.7 MiB) TX bytes:2339585157 (2.1 GiB)<br>Interrupt:174 |

Table 5 below is an example of WDS Table in a driver.

TABLE 5

Example of WDS Table in a Driver
WDS Table

| index | MAC | Next Hop | Age |
|---|---|---|---|
| 0: | DC:0C:5C:D0:59:AB | 08:02:8E:91:91:9A | 1 |
| 1: | 08:02:8E:91:91:9A | 08:02:8E:91:81:9A | 2 |
| 2: | 00:22:6C:87:CD:B2 | 08:02:8E:91:91:9A | 4 |
| 3: | 20:AB:37:5B:7D:64 | 08:02:8E:91:81:9A | 5 |
| 4: | AC:37:43:A0:7F:04 | 08:02:8E:91:81:9A | 2 |
| 5: | 74:81:14:DF:8C:7E | 08:02:8E:91:81:9A | 1 |

Table 6 below is an example of a flow base table.

TABLE 6

Example of a Flow Base Table

| index | hash | MAC | ID | UDP/TCP |
|---|---|---|---|---|
| 0 | 0x4 | 08:02:8E:91:91:9A | 08:02:8E:91:91:9A | 0 |
| 1 | 0x4 | 08:02:8E:91:91:9A | 08:02:8E:91:91:9A | 0 |
| 2 | 0x7 | 10:02:B5:37:10:E0 | 08:02:8E:93:50:6C | 1 |
| 3 | 0xc | 10:02:B5:37:10:E0 | 08:02:8E:93:50:6C | 1 |
| 4 | 0x14 | 00:03:7F:80:51:35 | 08:02:8E:93:50:6C | 1 |
| 5 | 0x15 | D8:0F:99:57:83:4F | 08:02:8E:93:50:6C | 1 |
| 6 | 0x19 | 00:03:7F:80:51:35 | 08:02:8E:93:50:6C | 0 |
| 7 | 0x1d | 10:02:B5:37:10:E0 | 08:02:8E:93:50:6C | 0 |
| 8 | 0x23 | D8:0F:99:57:83:4F | 08:02:8E:93:50:6C | 0 |
| 9 | 0x29 | 10:02:B5:37:10:E0 | 08:02:8E:93:50:6C | 0 |
| 10 | 0x2a | 10:02:B5:37:10:E0 | 08:02:8E:93:50:6C | 0 |
| 11 | 0x32 | 10:02:B5:37:10:E0 | 08:02:8E:93:50:6C | 0 |
| 12 | 0x35 | 08:02:8E:91:91:9A | 08:02:8E:91:91:9A | 0 |
| 13 | 0x37 | D8:0F:99:57:83:4F | 08:02:8E:93:50:6C | 1 |
| 14 | 0x3b | 10:02:B5:37:10:E0 | 08:02:8E:93:50:6C | 0 |

Computer Implementation

Figure 13:
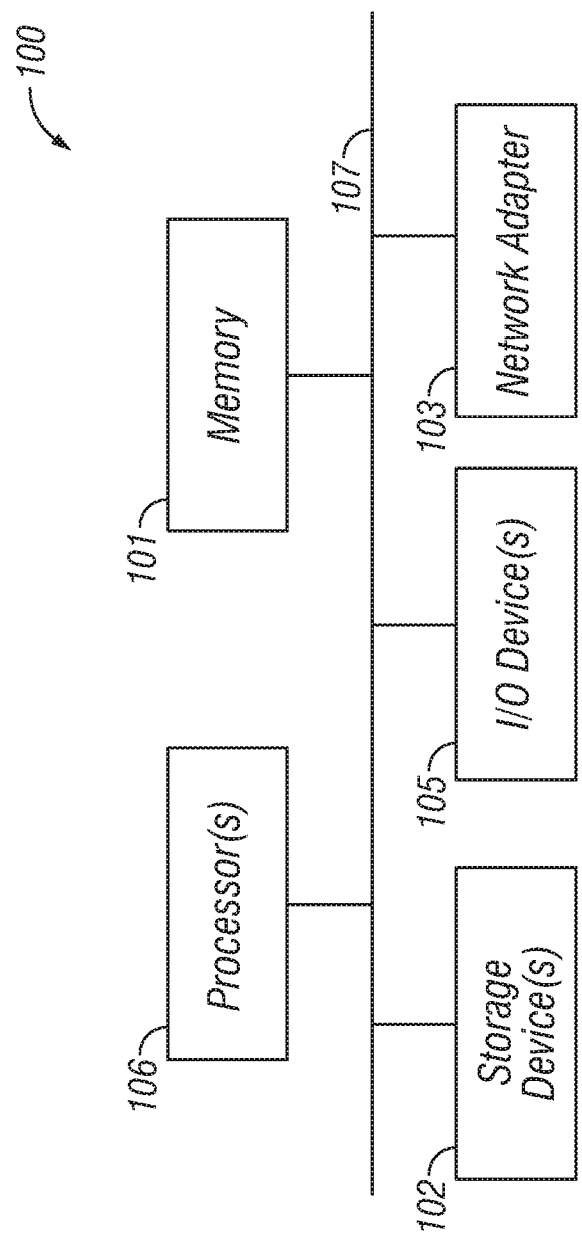
FIG. 13 is a block schematic diagram showing a machine in the example form of a computer system within which a set of instructions for causing the machine to perform one or more of the methodologies discussed herein may be executed.

FIG. 13 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 100 may include one or more central processing units ("processors") 106, memory 101, input/output devices 105, e.g. keyboard and pointing devices, touch devices, display devices, storage devices 102, e.g. disk drives, and network adapters 103, e.g. network interfaces, that are connected to an interconnect 107.

In FIG. 13, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 101 and storage devices 102 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 101 can be implemented as software and/or firmware to program one or more processors to carry out the actions described above. In some embodiments of the invention, such software or firmware may be initially provided to the processing system 100 by downloading it from a remote system through the computing system, e.g. via the network adapter 103.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method in a communications network comprising a plurality of access points (APs), the method comprising:
    modifying one or more management frames in Layer 2 in the Open System Interconnection (OSI) model to create an accurate network map in said network and, when a network map exists, to update said network map, wherein said management frames comprise IEEE 802.11 beacon frames.

2. The method of claim 1, further comprising:
    when a wireless client joins the network, an associating AP communicating association of the client all other APs directly (EventA);
    said associating AP timestamping Event A with an accurate time stamp; and
    said associating AP communicating with said other APs using robust data rates over a wireless connection and TCP/IP or higher layer protocols.

3. The method of claim 2, further comprising:
    when a wireless client is disconnected from the network, when the client disconnects by sending a packet (EventB), all APs communicating the disconnect using robust data rates or robust protocols;
    when an AP triggers removal of the client from an AP (EventC), said APs communicating once the AP removes the client from its list; and
    when the AP times out the client association (EventD), said APs communicating when timeout is triggered.

4. The method of claim 1, further comprising:
    when a wireless client roams and roaming is triggered by an original AP, a new AP providing a notification when basic service set transition management (BTM) is accepted (EventE); and
    when a wireless client roams and roaming is triggered by the new AP, the original AP providing a notification when deauth is accepted (EventF) and the new AP then notifying all of the other APs when it receives a reassociation packet.

5. The method of claim 1, further comprising when an Ethernet port is unplugged:
when what is behind the port is detectable, removing all of what is behind that port from all bridge tables; and
when what is behind the port is not detectable, reducing a bridge update interval for a predetermined time to allow old entities to time out quickly.

6. The method of claim 1, further comprising:
when an Ethernet port is plugged in to a port, detecting an identity of what is on the port before adding the port to a bridge table for other parts of network into which it is bridged.

7. The method of claim 1, further comprising:
detecting a hotplug event; and
triggering an update to all Ethernet devices by sending layer 2 packets or by timing out the entries in forwarding tables;
wherein the update is triggered by the APs that have decided to change the topology or APs where their immediate neighbors have changed;
wherein said APs broadcast or multicast again indicating what is connected to them; and
wherein said APs send a packet to each other AP and asks each other AP to rediscover all clients that are connected to it.

8. The method of claim 1, further comprising:
each AP maintaining a timestamped client table; and
establishing said timestamps via timers in each AP using any of an IEEE 802.11 time sync function (TSF), network time protocol (NTP) time, and IEEE 1588.

9. The method of claim 8, further comprising establishing said timestamps via timers in each AP using the IEEE 802.11 time sync function (TSF):
said APs periodically exchanging timing information through beacon frames to maintain timing synchronization; and
said APs adopting a received timing when it is later than the AP's own TSF timer.

10. The method of claim 8, further comprising:
said APs periodically exchanging timing information through IEEE 1905.1 data frames to maintain timing synchronization.

11. The method of claim 8, further comprising:
synchronizing the timer in each client via GPS and/or s a cellular base station.

12. The method of claim 11, further comprising:
when the clients are GPS time synched, sending said time to the APs in an association message to provide a time to be used by all of the APs.

13. The method of claim 1, further comprising:
establishing a master-slave relationship between the APs, where certain APs are masters that provide time for time stamp purposes.

14. The method of claim 1, further comprising:
a router sending packets to at least two APs;
said at least two APs trying to connect to the client; and
said client connecting to one of the at least two APs.

15. The method of claim 1, further comprising:
using Bluetooth to localize and triangulate a client; and
combining both Bluetooth information regarding said client and beacon time to generate a topology update message.

16. The method of claim 1, further comprising:
using a beacon frame to signal a topology update.

17. The method of claim 1, further comprising:
using a BLE advertisement to signal a topology update.

* * * * *